United States Patent
Marques et al.

(10) Patent No.: US 8,917,165 B2
(45) Date of Patent: Dec. 23, 2014

(54) RFID TAG DETECTION AND RE-PERSONALIZATION

(75) Inventors: Joseph P. Marques, Leesburg, VA (US); Steven H. Barry, Arlington, VA (US)

(73) Assignee: The MITRE Corporation, McLean, VA (US)

(*) Notice: Subject to any disclaimer, the term of this patent is extended or adjusted under 35 U.S.C. 154(b) by 1289 days.

(21) Appl. No.: 12/039,360

(22) Filed: Feb. 28, 2008

(65) Prior Publication Data

US 2008/0218316 A1    Sep. 11, 2008

Related U.S. Application Data

(60) Provisional application No. 60/905,574, filed on Mar. 8, 2007.

(51) Int. Cl.
*H04Q 5/22* (2006.01)
*G06Q 10/00* (2012.01)
*G06Q 30/00* (2012.01)

(52) U.S. Cl.
CPC ...... *G06Q 10/00* (2013.01); *H04Q 2213/13095* (2013.01); *G06Q 30/00* (2013.01)
USPC ..... 340/10.52; 340/10.1; 340/10.2; 340/10.3; 340/10.31; 340/10.32; 340/10.33; 340/10.34; 340/10.4; 340/10.41; 340/10.42; 340/10.5; 340/10.51; 340/10.6; 340/572.1; 340/572.2; 340/572.3; 340/572.4; 340/572.5; 340/572.6; 340/572.7; 340/572.8; 340/572.9

(58) Field of Classification Search
CPC ............ G06K 7/0008; G06K 19/0723; G06K 7/10039; G06Q 30/02; G06Q 10/087; G06Q 40/00; G06Q 20/1085; G06Q 20/341; G06Q 20/342; G07F 7/1008; G07F 17/145; G07F 19/20; G07C 1/14; G07C 1/10; G07B 15/04
USPC ............... 340/10.52, 10.1–10.6, 572.1–572.9
See application file for complete search history.

(56) References Cited

U.S. PATENT DOCUMENTS 5,600,811 A * 2/1997 Spielman et al. ............. 712/203
5,819,234 A * 10/1998 Slavin et al. ................. 340/10.4

(Continued)

*Primary Examiner* — George Bugg
*Assistant Examiner* — Paul Obiniyi
(74) *Attorney, Agent, or Firm* — Sterne, Kessler, Goldstein & Fox P.L.L.C.

(57) ABSTRACT

Systems, methods and computer program products for detecting and re-personalizing are provided herein. In an embodiment, the invention operates by obtaining an ID (i.e., an identification, such as a Dynamic Unique Identifier) from a RFID tag, generating a new ID, and writing the new ID to the RFID tag. The ID read from the tag is used to lookup a subject's record in a database. If the write of the new ID to the tag is verified, then database changes are committed to link the new ID to the subject. In an alternative embodiment, the invention operates by obtaining data from a memory of a RFID tag, wherein the memory has a first partition and a second partition, generating a new ID, and writing the new ID to either of the first partition or the second partition of the RFID tag. If such write is verified, then the new ID is written to the other partition of the RFID tag. The data from the tag is used to lookup a subject's record in a database. If either write to the first partition or second partition is verified, then database changes are committed to link the new ID to the subject.

16 Claims, 8 Drawing Sheets

(56) References Cited

U.S. PATENT DOCUMENTS

| | | | |
|---|---|---|---|
| 6,331,972 B1* | 12/2001 | Harris et al. | 370/313 |
| 6,538,943 B2* | 3/2003 | Rogenmoser et al. | 365/203 |
| 6,664,891 B2* | 12/2003 | Davies et al. | 340/505 |
| 6,742,099 B1* | 5/2004 | Mendoza et al. | 711/173 |
| 6,879,960 B2* | 4/2005 | Nascenzi et al. | 705/14.4 |
| 6,944,633 B1* | 9/2005 | Higa et al. | 1/1 |
| 7,025,261 B2* | 4/2006 | Lagosanto et al. | 235/385 |
| 7,130,982 B2* | 10/2006 | Boutcher et al. | 711/173 |
| 7,185,179 B1* | 2/2007 | Furusho | 712/214 |
| 7,624,120 B2* | 11/2009 | Pawar et al. | 1/1 |
| 7,664,946 B2* | 2/2010 | Thomas et al. | 713/150 |
| 7,812,706 B2* | 10/2010 | Suzuki et al. | 340/10.1 |
| 7,814,119 B2* | 10/2010 | Sato et al. | 707/781 |
| 7,814,297 B2* | 10/2010 | Wezelenburg | 712/22 |
| 7,843,317 B2* | 11/2010 | Angell et al. | 340/10.5 |
| 7,893,815 B2* | 2/2011 | Friedrich | 340/10.2 |
| 7,911,346 B1* | 3/2011 | Claudatos et al. | 340/572.4 |
| 8,217,759 B2* | 7/2012 | Tessier | 340/10.1 |
| 8,284,033 B2* | 10/2012 | Moran | 340/10.4 |
| 8,299,900 B2* | 10/2012 | Kodialam et al. | 340/10.2 |
| 8,344,878 B2* | 1/2013 | Goldman et al. | 340/539.13 |
| 2001/0007333 A1* | 7/2001 | Goman et al. | 235/380 |
| 2002/0040276 A1* | 4/2002 | Ewing et al. | 702/19 |
| 2002/0099609 A1* | 7/2002 | Nascenzi et al. | 705/21 |
| 2003/0191802 A1* | 10/2003 | Zhao et al. | 709/203 |
| 2004/0078238 A1* | 4/2004 | Thomas et al. | 705/3 |
| 2004/0164844 A1* | 8/2004 | Maeda et al. | 340/5.8 |
| 2004/0181625 A1* | 9/2004 | Armstrong et al. | 710/200 |
| 2004/0181657 A1* | 9/2004 | Armstrong et al. | 713/1 |
| 2004/0205272 A1* | 10/2004 | Armstrong et al. | 710/260 |
| 2005/0027986 A1* | 2/2005 | Thomas et al. | 713/176 |
| 2005/0055595 A1* | 3/2005 | Frazer et al. | 713/400 |
| 2005/0137981 A1* | 6/2005 | Maes | 705/44 |
| 2005/0223127 A1* | 10/2005 | Boutcher et al. | 710/22 |
| 2005/0283621 A1* | 12/2005 | Sato et al. | 713/189 |
| 2006/0082438 A1* | 4/2006 | Bazakos et al. | 340/5.82 |
| 2006/0082439 A1* | 4/2006 | Bazakos et al. | 340/5.82 |
| 2006/0179362 A1* | 8/2006 | Alves et al. | 714/52 |
| 2006/0224867 A1* | 10/2006 | Tran | 712/226 |
| 2007/0016744 A1* | 1/2007 | Stocker et al. | 711/165 |
| 2007/0028076 A1* | 2/2007 | Wezelenburg | 712/22 |
| 2007/0030126 A1* | 2/2007 | Friedrich | 340/10.2 |
| 2007/0050577 A1* | 3/2007 | Kimura et al. | 711/162 |
| 2007/0204066 A1* | 8/2007 | Cohen et al. | 709/246 |
| 2008/0074238 A1* | 3/2008 | Kodialam et al. | 340/10.2 |
| 2008/0074256 A1* | 3/2008 | Hirai et al. | 340/541 |
| 2008/0122584 A1* | 5/2008 | Itasaki et al. | 340/10.51 |
| 2008/0155072 A1* | 6/2008 | Cochran et al. | 709/222 |
| 2008/0243753 A1* | 10/2008 | Gormish et al. | 707/1 |
| 2009/0002128 A1* | 1/2009 | Jung | 340/10.1 |
| 2009/0040023 A1* | 2/2009 | Pretorius | 340/10.1 |
| 2009/0077101 A1* | 3/2009 | Li et al. | 707/10 |
| 2009/0243814 A1* | 10/2009 | Yamamoto | 340/10.52 |
| 2010/0001064 A1* | 1/2010 | Goman et al. | 235/380 |
| 2010/0148930 A1* | 6/2010 | Silverbrook et al. | 340/10.1 |
| 2011/0057779 A1* | 3/2011 | Canard et al. | 340/10.42 |

* cited by examiner

RFID TAG DETECTION AND RE-PERSONALIZATION

The present application claims the benefit of U.S. Provisional Patent Application No. 60/905,574 filed on Mar. 8, 2007, which is herein incorporated by reference in its entirety.

BACKGROUND OF THE INVENTION

1. Field of the Invention

The present invention is generally directed to RFID tag detection, and more particularly directed to RFID tag detection and re-personalization.

2. Background Art

There is a critical need to reduce congestion and speed processing in government processes that broadly fit into the category of "credential verification." For example, travelers moving through U.S. Ports of Entry must show travel documents which are checked for accuracy, validity, and to assure that the document is being used by the person to whom it was issued. Back-end databases are used to verify that biographic and issuance information is current, valid, and that biometric information matches the individual at the portal. However, it takes time to do all of these checks and hours-long backups are seen on a routine basis because of these checks. These backups have severe economic, social, and environmental impacts.

Many technologies have been proposed to help speed these processes. Taken broadly, they vary from smart cards using sophisticated encryption and authentication to simple RFID tags supporting meter-long read distances and fast access. The advantages of RFID include low cost, very small size, easier presentation of the tag to a reader, and concurrent operation with other tags within range. RFID allows information related to a person to be pre-fetched when the RFID "tag" is sensed at a distance; the retrieved information is made available to an inspector when the person arrives at the checkpoint. Processing times for individuals at Ports of Entry can be reduced by at least half, if this process is well-implemented.

However, a common objection to the use of RFID is that information on the tag is relatively easily sensed by third parties. Even though no privacy-sensitive information is stored on tags (a unique identifier [UID] is stored and used to access a secure backend database), there is a concern that the UID may be compromised by a covert read of the information on a tag and become the equivalent of a "name" for the person who holds the tag. Thus, by continued surveillance of the traveler, the third party may be able to associate the UID with the traveler's identity. A means to address this concern would be to encrypt the UID. But the encrypted UID is just a different pattern of bits that can be considered a stable "nickname" for the UID, and the same concern described above applies—it would be possible to track the nickname instead of the UID.

Accordingly, what are needed are improved approaches for using RFID tags for applications such as those described above, as well as other applications involving identification/verification of persons or things, where security and confidentiality of such persons/things are not compromised.

BRIEF SUMMARY OF THE INVENTION

The present invention is directed to systems, methods and computer program products for detecting and re-personalizing.

In an embodiment, the invention operates by obtaining an ID (i.e., an identification, such as a Dynamic Unique Identifier) from a RFID tag, generating a new ID, and writing the new ID to the RFID tag. The ID read from the tag is used to lookup a subject's record in a database. If the write of the new ID to the tag is verified, then database changes are committed to link the new ID to the subject.

In an alternative embodiment, the invention operates by obtaining data from a memory of a RFID tag, wherein the memory has a first partition and a second partition, generating a new ID, and writing the new ID to either of the first partition or the second partition of the RFID tag. If such write is verified, then the new ID is written to the other partition of the RFID tag. The data from the tag is used to lookup a subject's record in a database. If either write to the first partition or second partition is verified, then database changes are committed to link the new ID to the subject.

Further features and advantages of the present invention, as well as the structure and operation of various embodiments thereof, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 1:
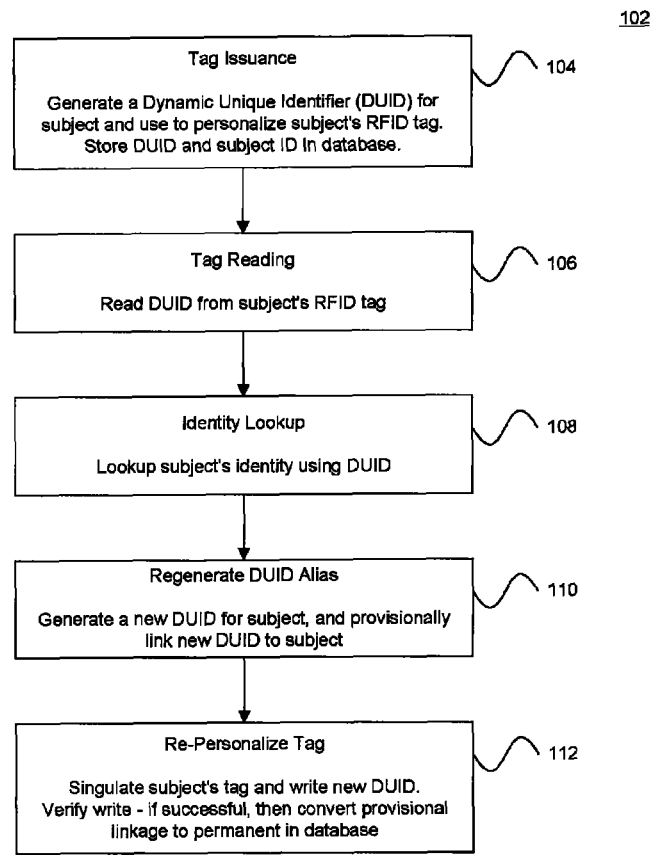
FIG. 1 is a flowchart illustrating the operation of a RFID tag detection and re-personalization method, according to an embodiment of the invention.

The features and advantages of the present invention will become more apparent from the detailed description set forth below when taken in conjunction with the drawings. In the drawings, like reference numbers generally indicate identical, functionally similar, and/or structurally similar elements. Generally, the drawing in which an element first appears is indicated by the leftmost digit(s) in the corresponding reference number.

DETAILED DESCRIPTION OF THE INVENTION

1. Overview of the Invention

The present invention is directed to system, method and computer program product embodiments for detecting and re-personalizing RFID tags. Although embodiments of the invention are sometimes described in terms of government use, such as at ports of entry, the invention is not limited to these examples. Instead, the invention is useful in any application involving the identification and/or verification of persons and/or things. The invention does not compromise the security and/or confidentiality of such persons and/or things.

According to embodiments, conceptually, an apparently random alias stored to a RFID tag is kept synchronized with a networked database that associates that alias with a verified identity. With each use, a new random alias is chosen and the tag/database relationship is kept current. In an embodiment, the tag's assigned alias is the output of a pseudo-random number generator assessed for uniqueness. However, this is only an example and the alias may be generated algorithmically using cryptographic keys, hash functions, lookup tables, or any other mechanism that facilitates application specific data management.

More particularly, according to embodiments, an unique identifier (UID) is associated with a subject (either a person or thing) and stored on a RFID tag. The UID is dynamically changed each time the tag is read. For reference purposes, and not purposes of limitation, this act is herein called "re-personalization." As such re-personalization changes the UID each time the tag is used, discovery and use of a tag nickname becomes enormously more complicated.

Such operation is depicted in greater detail in FIG. 1, which shall now be described.

In step 104, a tag issuance step is performed. During this step, a subject is questioned to establish their true identity and this information is entered into a database. A Dynamic Unique Identifier (DUID) is algorithmically generated that refers to the subject's primary identity record and is stored as an index in the database. A new RFID tag is selected from inventory and personalized (written) with this unique identifier in a controlled environment. Once this initial personalization process is complete, we have a synchronized tag/database relationship, with the DUID on the tag acting as a lookup to the subject's identity record.

In step 106, a tag reading step is performed. During this step, a RFID reader monitors a specific area using a predetermined antenna configuration. Tag bearers passing through this space will be queried for their DUIDs. When a RFID tag receives sufficient power to respond, it will provide its DUID. In an embodiment, such RFID tag provides its DUID only once, and then goes silent. This prevents excessive tag chatter and ensures that many tags may be simultaneously read as multiple subjects pass through the antenna coverage area.

In step 108, an identity lookup step is performed. During this step, each DUID obtained during the tag reading step 106 is used to lookup the identity record for the bearer in the database. Use of these identity records is implementation and application specific.

In step 110, a regenerate DUID alias step is performed. During this step, a new DUID is generated for the bearer identified in step 108. The new DUID is provisionally linked to the bearer's identity records in the database, pending successful re-personalization in the following step.

In step 112, a re-personalization tag step is performed. During this step, while the bearer is still within range of the RFID reader and antennas, the bearer's RFID tag is re-personalized with the new DUID generated in step 110. During this step, the following steps are performed:
(1) Singulate (isolate) the bearer's RFID tag.
(2) Write the new DUID to the bearer's RFID tag.
(3) Verify such write operation.
(4) If the write operation was successful, then commit (make permanent) the linkage of the new DUID with the bearer's identity records in the database. Otherwise, the provisional linkage of the new DUID with the bearer's identity records is abandoned.

2. Technology Limitations

Synchronization between the RFID tag and database is critical. If a tag is improperly updated with incomplete or bad data, it will no longer point to the appropriate identity record for its bearer. Future reads of this tag will yield a useless DUID that points nowhere.

A key challenge lies in the re-personalization step 112. There is a limited window of opportunity to change the tag contents and this is affected by a variety of factors including:

Ambient electromagnetic noise introducing errors

Alignment of the tag antenna in relation to the reader/writer antenna

Interference caused by proximity of metallic objects to the tag

Subjects' speed through the antenna coverage area

Insufficient electromagnetic energy to permit tag to save new data

Maintaining the state of the database is accomplished by using transactions. After a new DUID is generated and associated with a bearer's identity record, it is only provisionally linked. If, at any point, the system is unable to update the RFID tag with this new DUID, the database transaction is rolled-back and the integrity of the data remains intact.

Unfortunately, there is no concept of a transaction for RFID writes. If one begins to write new data to a tag and it falls out of range, there is no mechanism to revert those data bits that were partially written before the failure. The memory contents (holding the DUID) of the tag may now be corrupt, with no way of knowing the final result. This would lead to three possible error states:

(1) The tag was not re-personalized with the new ID at all. Its original ID was still unchanged at the point where failure was detected.

(2) The tag was completely re-personalized with the ID but it could not be verified, leading the writer to believe it was unsuccessful even though it was complete.

(3) The tag was partially re-personalized with the new ID before failure was detected. The data on the tag is now a mix of the new and old IDs and quite corrupt.

These cases arise due to the way that RFID writes occur. According to the current state of the art, tag data can only be written in fixed size chunks that are much smaller than the overall memory size. Therefore, to write the 96-bits of RFID memory in a Generation 2 tag requires six underlying write requests, each 16 bits in size. The ability to do the entire 96-bits in a single atomic operation is beyond the limited capability of current passively powered RFID technology and over-the-air protocols. Requiring six chained operations to completely populate the DUID provides many opportunities for failure, with the worst case occurring halfway through the aggregate operation.

Moreover, cases #2 and #3 cause the RFID reader/writer to be unable to retry the write operation a second time. With many tags in the field at once, a write operation must be preceded by a declaration of which tag should perform the operation (i.e. singulation). The tag is identified solely by its memory contents (in this case the DUID). If the previous write corrupted the tag contents (Case #3) or succeeded despite failing the verification step (Case #2), then trying to perform the operation again will trivially fail because the original tag, as identified and isolated by its contents, no longer exists. For example, a second request for tag #243223 to change its contents to #987654 cannot succeed because the original identifier (#243223) is no longer valid; no tag will respond to the request.

3. Alternative Embodiment for Tag Issuance

The invention includes an alternative embodiment for tag issuance. This embodiment includes the following advantageous features:

(a) Errors during any write operation are detected.

(b) Overall write status is verified by reading and confirming the contents following the write operation.

(c) Write failure at any point does not corrupt the earlier, legitimate DUID on the tag before the update (re-personalization) process began.

(d) The tag remain usable despite periodic inability to re-personalize successfully.

(e) Tags remain in sync with the database at all times.

Figure 2:
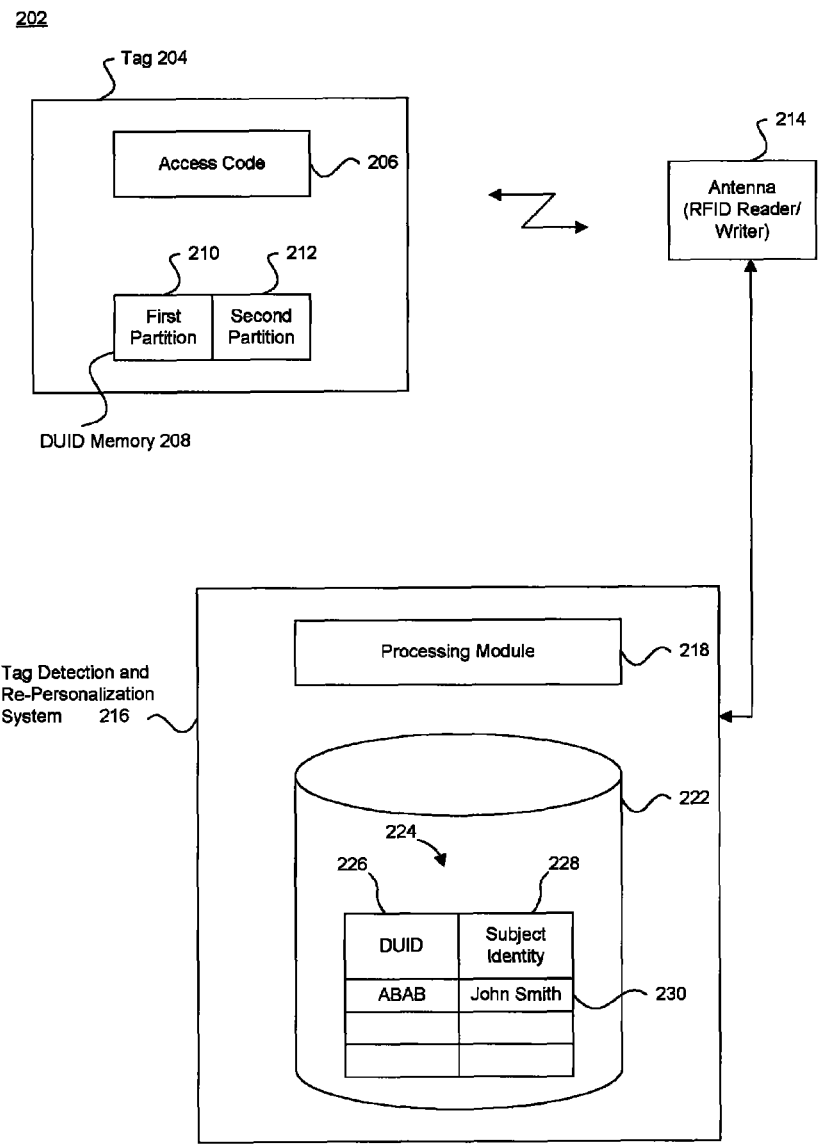
FIG. 2 is a block diagram depicting the operation of a tag detection and re-personalization system, according to an embodiment of the invention.

FIG. 2 is a block diagram depicting the operation of a tag detection and re-personalization system 216, according to this alternative embodiment of the invention. As shown, each tag 204 operable with this system 216 includes a DUID memory 208 which comprises a first partition 210 and a second partition 212. In an embodiment, the first and second partitions 210, 212 are equal in width, and are equal to 50% of the width of the DUID memory 208. In an embodiment, the width of the DUID memory 208 is 96 bits, such that the first and second partitions 210, 212 are each 48 bits in width. However, this embodiment is only an example, and other widths can also be used.

The partitions 210, 212 are operated on independently, and at no time will one partition be modified until the other's modification has been confirmed as successful. In this way, redundant storage of the DUID in the RFID tag is established, thereby ensuring that any failures leave a redundant copy of the original DUID to enable future use of the RFID tag.

Figure 3:
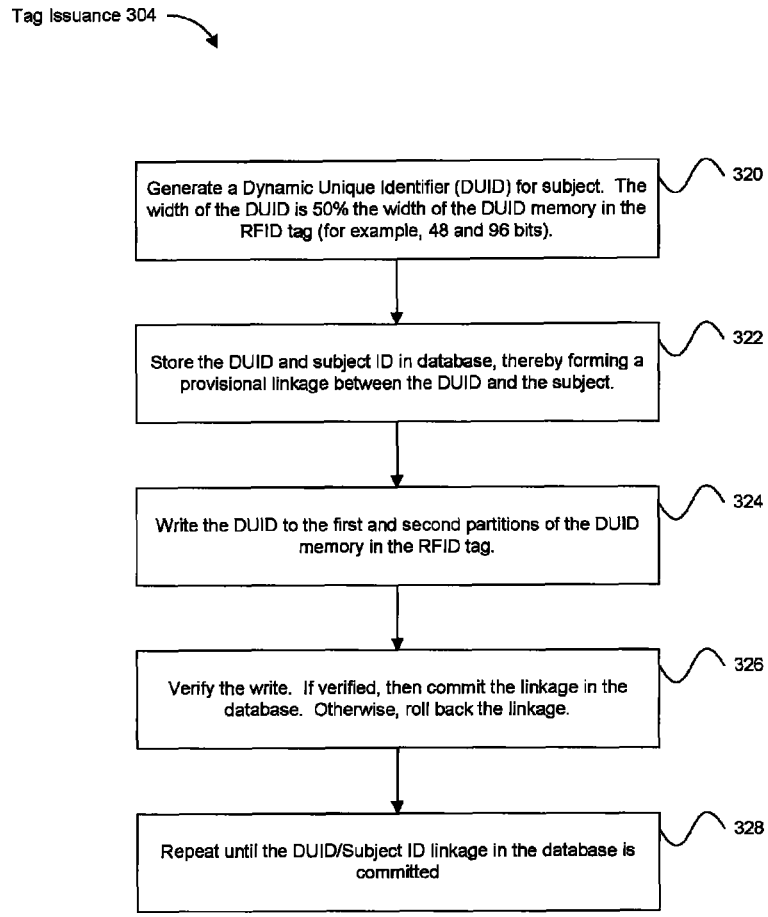
FIG. 3 is a flowchart illustrating the operation of an improved tag issuance method, according to an embodiment of the invention.

Operation of this alternative embodiment for tag issuance shall now be described in detail with reference to FIG. 3, as well as continued reference to FIG. 2. In particular, FIG. 3 depicts a tag issuance process 304, which is a modification of step 104 in FIG. 1.

In step 320, a DUID is generated for a subject. The width of this DUID is equal to the width of a partition 210, 212, such as, for example but not limitation, 48 bits.

In step 322, the DUID and subject identification information (hereafter referred to as "subject ID" or "subject identity") is stored in a database 222 of tag detection and personalization system 216, thereby forming a provisional link between the DUID and the subject ID. The subject ID may include any implementation or application specific information relating to the subject. Since this link is only provisional, such changes to database 222 may be rolled back later if errors occur during RFID writing.

In step 324, a RFID tag 204 is selected from inventory for the subject, and the DUID generated in step 320 is written to both the first partition 210 and the second partition 212 of the tag 204.

In step 326, the writes of step 324 are verified. If verified, then the linkage of the DUID with the subject ID are committed in the database 222, thereby making such linkage permanent. If the writes of step 324 are not verified, then the database 222 is rolled back such that the linkage is discarded. It is noted that committing and rolling back a database are well known operations; accordingly, details of achieving such operations are not provided herein.

As indicated by step 328, steps 320-326 are repeated as necessary, until the DUID/subject ID linkage in the database is committed and made permanent. Since tag issuance occurs in a controlled environment, a repetitive failure is indicative of hardware malfunction or RFID tag damage and mitigated by substitution.

Optionally, each tag 204 is assigned a 32-bit access code to prevent others from changing the data in the tag 204. Such access code is stored in an access code memory 206 of the tag 204. The access code protects the DUID memory 208 (and may also protect other memory of tag 204). If an access code is used, then such access code must be employed in step 324 to write the DUID to the first and second partitions 210, 212. Use of access codes with RFID tags is well known and may be defined by pertinent standards, such as ISO/IEC 18000-6: 2004 with Amd 1:2006 (Information technology—Radio frequency identification for item management Part 6: Parameters for air interface communications at 860 MHz to 960 MHz). The amendment provides international approval of RFID technologies previously known as Electronic Product Code Generation 2 (EPC Gen2) and is generally known as ISO 16000-6C.

As a result of steps 320-328, a tag 204 containing two redundant copies of the DUID has been created, and such DUID has been linked to subject ID in the database 222. This is illustrated in FIG. 2, for example, as record 230 in database 222. A read of this tag 204 will detect that the partitions 210, 212 are in agreement, that the previous write was completed in its entirety, and that the database 222 is able to supply a non-empty response to an ID lookup.

4. Alternative Embodiment for Subsequent Tag Reads and Updates (Re-Personalization)

According to an embodiment, when subjects bearing personalized tags 204 pass through an RFID portal, the tags 204 are read, identity records are retrieved using DUIDs from database 222, and the tags 204 are re-personalized with new DUIDs.

Unlike initial tag personalization (as described in the preceding section), the tag population is neither isolated (more than one tag is visible at a time) nor controllable (the tag bearer passes through the antenna field without interaction). Hence, the tag detection and re-personalization system 216 must identify each RFID tag 204, update its contents with a new DUID, and then proceed to the next tag 204 quickly.

To maintain tag data integrity and synchronicity with the database 222, several staged write operations must be undertaken in sequence.

Figure 4:
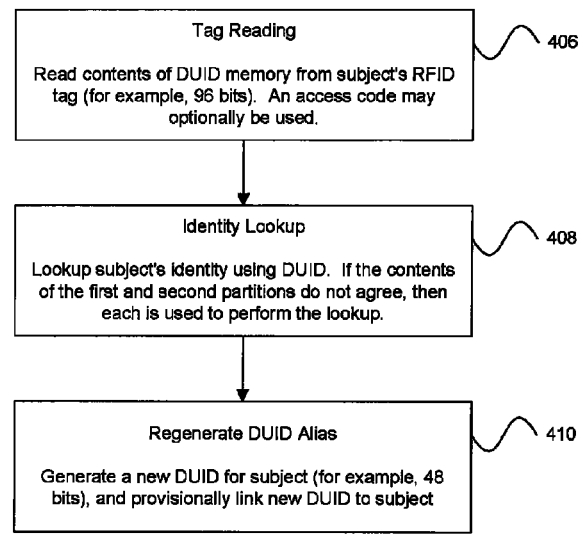
FIG. 4 is a flowchart illustrating the operation of improved tag reading, identify lookup and regenerate DUID alias method, according to an embodiment of the invention.

FIG. 4 illustrates this process, according to an embodiment of the invention. In the following, optionally, access codes are used as necessary using well known methods. Also, optionally, well known methods are used to interrogate RFID tags while limiting excessive tag interference.

In step 406, the DUID memory 208 of each tag 204 is read using an antenna 214 (it is noted that antenna 214 may represent a single or a plurality of antennas). Consider the example shown in FIG. 6, where a DUID equal to ABAB is stored in the first partition 210 and second partition 212 of DUID memory 208A of a particular tag 204A. In this case, in step 406, the tag detection and re-personalization system 216 reads ABABABAB from this DUID memory 208A (as indicated by 606 in FIG. 6).

Figure 6:
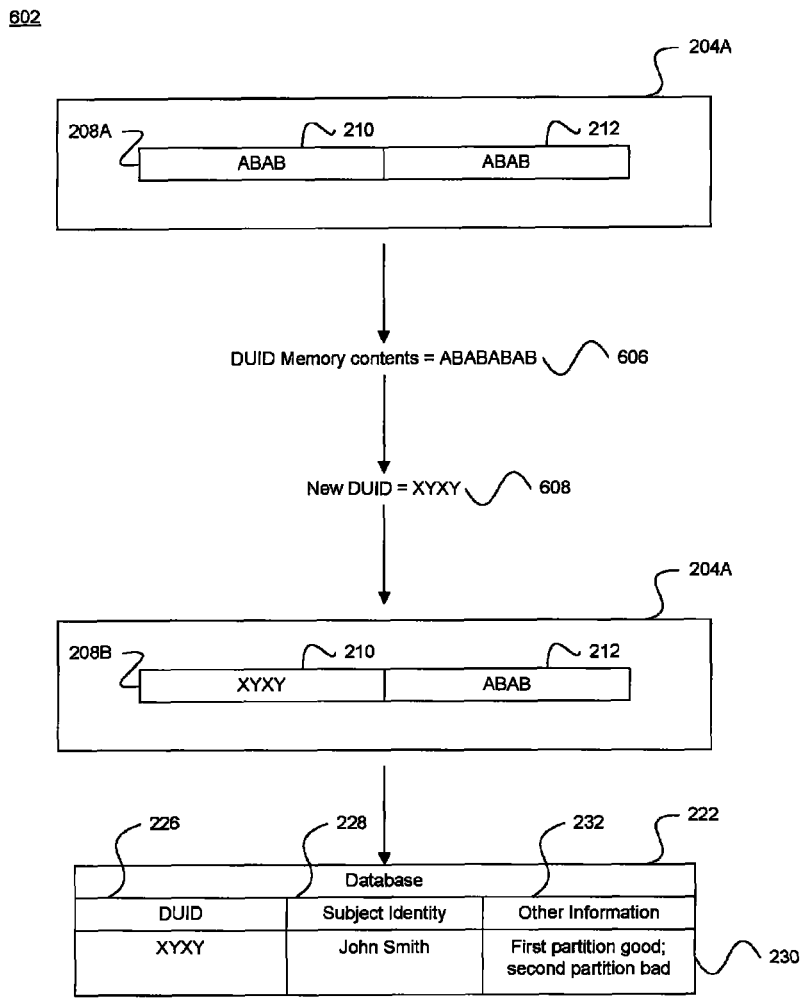
FIGS. 6 and 7 are examples used to illustrate the operational embodiments depicted in FIGS. 3-5.

In step 408, tag detection and re-personalization system 216 uses the DUID read from each tag 204 to lookup the associated subject's subject ID in database 222. In the example of FIG. 6, the DUID equal to ABAB would be used for this lookup operation.

It is possible that the contents of the first partition 210 and second partition 212 do not agree. In this case, tag detection and re-personalization system 216 would separately use each of the contents of the first partition 210 and the second partition 212 to perform the lookup operation. This scenario is further described in Section 5.

In step 410, a new DUID (of the same width as that described above) is generated for each tag with a successful lookup in step 408. Each new DUID is provisionally linked with the associated subject ID in database 222. In the example of FIG. 6, a new DUID equal to XYXY has been generated for this particular tag 204A (as indicated by 608 in FIG. 6). Also, this new DUID of XYXY has been provisionally linked to the subject record of John Smith as indicated by row 230 of database 222.

Figure 5:
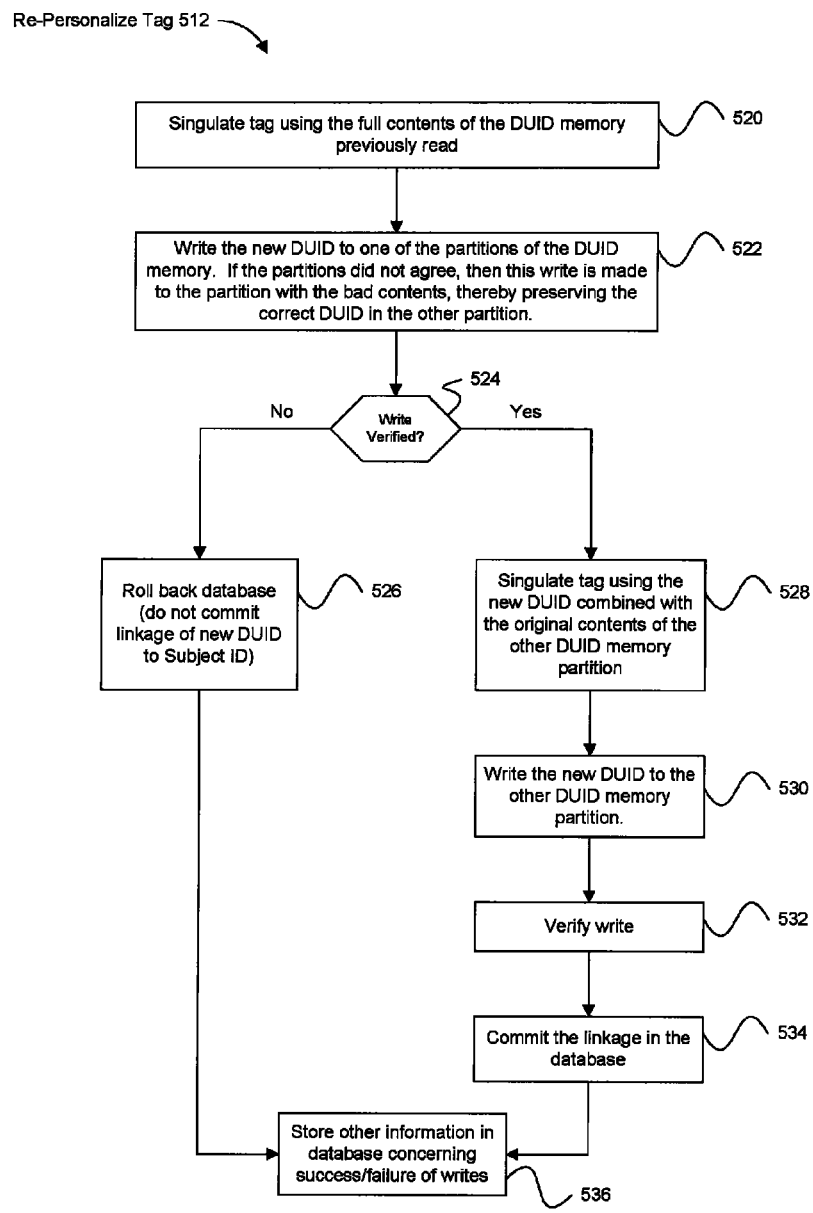
FIG. 5 is a flowchart illustrating the operation of an improved re-personalize tag method, according to an embodiment of the invention.

The herein description shall continue with reference to FIG. 5, which illustrates an alternative re-personalized tag process 512.

In step 520, each tag 204 is singled out by specifying the original contents of the DUID memory 208 read previously in step 406. Accordingly, in the example of FIG. 6, DUID memory contents 606 equal to ABABABAB is used to singulate on tag 204A. In an embodiment, tags not singulated will not participate in further exchanges. Singulation is described by applicable RFID standards such as those enumerated previously.

In step 522, tag detection and re-personalization system 216 writes the new DUID (generated in step 410) associated with the singulated tag to one of the singulated tag's partitions (either the first partition 210 or the second partition 212). In the example of FIG. 6, new DUID XYXY has been written to the first memory partition 210 of tag 204A, such that the contents of DUID memory (now indicated by 208B) is equal to XYXYABAB.

If the partitions 210, 212 do not agree (i.e., their contents differ), as determined in steps 406 and/or 408, then in step 522 the new DUID is written to the partition 210 or 212 containing bad data. By writing to the partition 210 or 212 with bad data, the valid DUID in the other partition is preserved. This scenario is further described in Section 5.

In step 524, tag detection and re-personalization system 216 verifies the write performed in step 522. If the write is not verified, then step 526 is performed.

In step 526, the provisional linkage made in step 410 is rolled back in database 222, thereby discarding such provisional linkage and the related changes to database 222. In this case, the original valid DUID in the other partition is preserved and can be later used to address the tag. Processing then continues with step 536, which is described below.

If, in step 524, the write of step 522 is verified, then step 528 is performed.

In step 528, tag detection and re-personalization system 216 once again singulates on the tag, this time using the new DUID concatenated with the original contents of the other partition that has not yet been re-personalized. In the example of FIG. 6, XYXYABAB is used to singulate on tag 204A.

In step 530, tag detection and re-personalization system 216 writes the new DUID to the other memory partition 210 or 212 of the re-singulated tag 204. In the example of FIG. 6, tag detection and re-personalization system 216 would attempt to write the new DUID (XYXY) to the second partition 212. For illustrative purposes, this write to the second partition 212 is indicated as having failed in the example of FIG. 6.

In step 532, tag detection and re-personalization system 216 verifies the write of step 530. As just noted, in the example of FIG. 6, the write of step 530 failed.

In step 534, the provisional linkage between the new DUID and the subject ID established in step 410 is made permanent, and the associated changes in database 222 are committed. It is noted that such operation of step 534 is performed whether or not the write of step 530 was successful or a failure. This operation is possible because the earlier write in step 522 had previously been verified. Thus, since at least one of the memory partitions 210 or 212 contains the new DUID, it is possible to commit the changes to database 222.

In step 536, which is optional, tag detection and re-personalization system 216 stores other information in database 222 relating to the success/failure of the writes in steps 522 and 530. In the example of FIG. 6, such information in column 232 of record 230 indicates that the write to the first partition 210 was successful, but the write to the second partition 212 was not successful.

5. Another Example of the Operation of FIGS. 4 and 5

Figure 7:
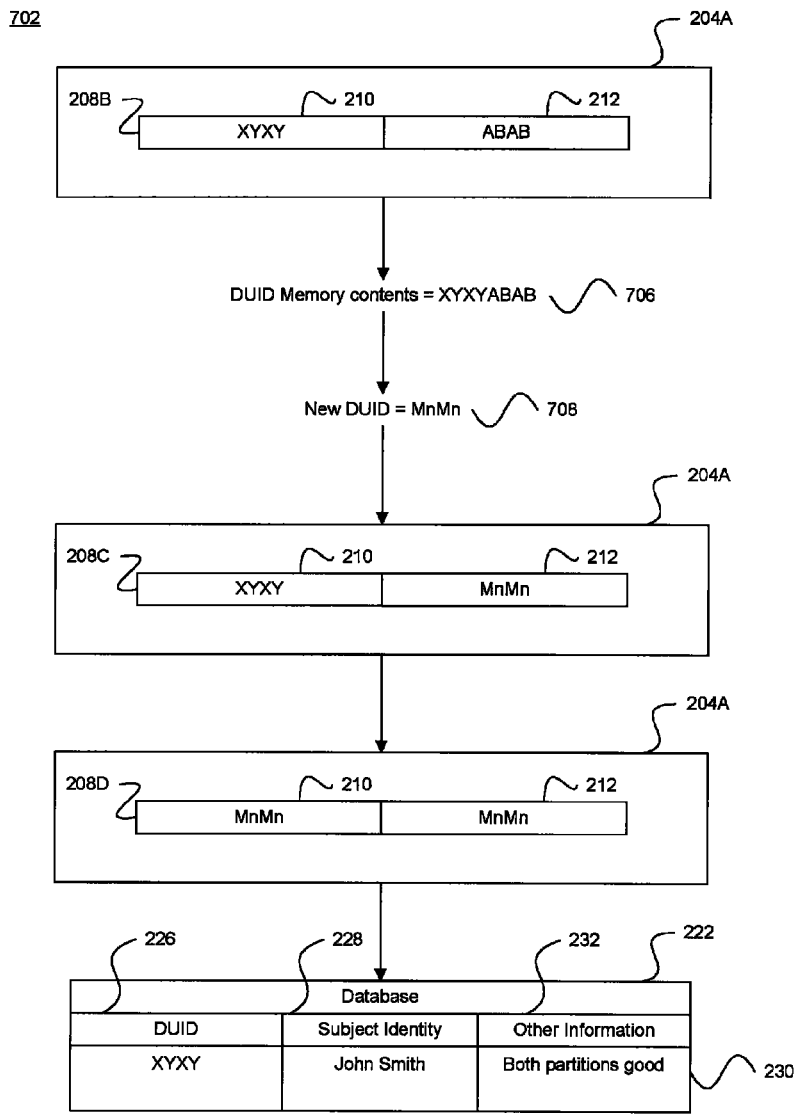

The operation depicted in FIGS. 4 and 5 shall now be reconsidered, this time with reference to the example shown in FIG. 7. In this example, which continues that shown in FIG. 6, a particular tag 204A has a DUID memory 208B where the first partition 210 stores XYXY, and the second partition 212 stores ABAB.

Referring first to FIG. 4, in step 406 the contents of DUID memory 208B is read. Accordingly, XYXYABAB is read (as indicated by 706 in FIG. 7).

In step 408, such DUID memory contents XYXYABAB is used to perform a lookup into database 222. Clearly, the contents of the first and second partitions 210, 212 do not agree. Thus, XYXY is first used to perform the lookup. If unsuccessful, ABAB is used to perform the lookup (the order can be reversed). In the example, XYXY results in a successful lookup of row 230 in database 222 (see FIG. 6).

In step 410, a new DUID for tag 204a is generated and provisionally linked to the client ID. In the example of FIG. 7, this new DUID is equal to MnMn (as indicated by 708 in FIG. 7), and the provisional linkage is indicated by row 230 of table 222.

Turning now to FIG. 5, in step 520, tag detection and re-personalization system 216 singulates on tag 204A using the contents of DUID memory 208B read in step 406. In the example of FIG. 7, XYXYABAB is used to singulate on tag 204A.

In step 522, tag detection and re-personalization system 216 writes the new DUID, MnMn, to one of the partitions 210, 212 of tag 204A. It is known from step 408 that the second partition 212 contains bad data. Accordingly, the new DUID, MnMn, is written to the second partition 212, thereby preserving the good data in the first partition 210.

In step 524, the write of step 522 is verified. As such write was successful in the example of FIG. 7, processing proceeds to step 528.

In step 528, tag detection and re-personalization system 216 re-singulates on tag 204A using the new DUID, MnMn, coupled with the contents of the memory partition not yet re-personalized, in this case the first partition 210. Accordingly, XYXYMnMn is used to re-singulate on tag 204A.

In step 530, tag detection and re-personalization system 216 attempts to write the new DUID, MnMn, to this other partition, in this case the first partition 210.

In step 532, tag detection and re-personalization system 216 verifies the write of step 530. In the example of FIG. 7, this write was successful, as indicated by the DUID memory (now indicated by 204D) containing MnMnMnMn.

In step 534, tag detection and re-personalization system 216 commits the provisional linkage established in step 410.

In step 536, which is optional, tag detection and re-personalization system 216 stores other information in database 222 relating to the success/failure of the writes to tag 204A. In this example, such information indicates that the contents of both the first and second partitions 210, 212 contain valid data.

6. Other Considerations

In an embodiment, the 48-bit address space for the Dynamic Unique ID provides approximately 281 trillion possible combinations. Assuming that a good random number generator and database integrity constraints are maintained, there is little risk of ID collision within the system. Greater width DUIDs can be employed in other embodiments, even more decreasing the likelihood of ID collision. The development and testing of pseudo-random number generators is well known and covered by standards such as ANSI X9.82-1:2006 (Random number generation part 1: Overview and basic principles). The proper handling of non-unique database keys is a function of database best practices.

If one or more update operations partially fail over the lifetime of a tag, it is theoretically possible that a tag ID could collide with another because partially written data yielded an unexpected 48-bit identifier that was previously in use. This may be mitigated by storing the last write status in the database (through, for example, processing of step 536 in FIG. 5), and/or intelligently performing later lookups with this knowledge in mind.

For instance, if tag Alpha previously failed an update in its first partition, we would mark this in the database and refuse to honor a database query that looked up this tag using that partition. Similarly, if tag Beta had had both partitions successfully updated when it was last seen, we would insist that both tag partitions agree to retrieve this tag identity.

7. Example Computer Implementation

Figure 8:
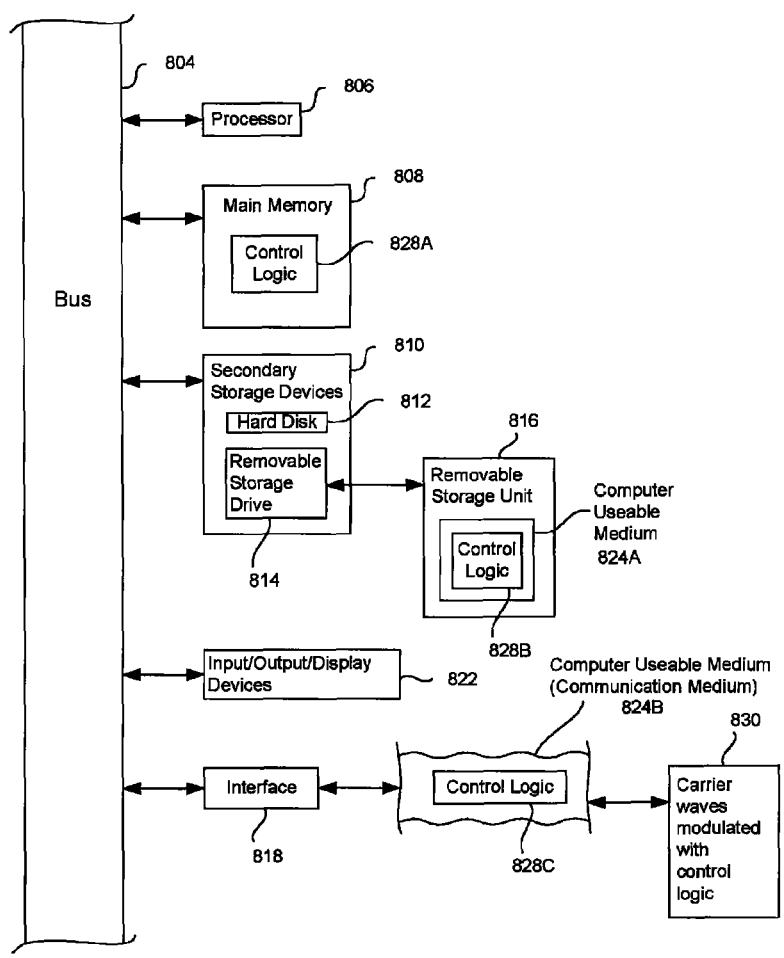
FIG. 8 illustrates an example computer useful for implementing components of the invention.

In an embodiment of the present invention, the system and components of the present invention described herein are implemented using well known computers, such as computer 802 shown in FIG. 8. For example, tag detection and re-personalization system 216 (and/or processing module 218 therein, which in certain embodiments performs the operations of system 216 described herein) can be implemented using computers 802.

The computer 802 can be any commercially available and well known computer capable of performing the functions described herein, such as computers, personal data assistants, as well as any other data processing device available from International Business Machines, Apple, Sun, HP, Dell, Compaq, Digital, Cray, etc.

The computer 802 includes one or more processors (also called central processing units, or CPUs), such as a processor 806. The processor 806 is connected to a communication bus 804.

The computer 802 also includes a main or primary memory 808, such as random access memory (RAM). The primary memory 808 has stored therein control logic 828A (computer software), and data.

The computer 802 also includes one or more secondary storage devices 810. The secondary storage devices 810 include, for example, a hard disk drive 812 and/or a removable storage device or drive 814, as well as other types of storage devices, such as memory cards and memory sticks. The removable storage drive 814 represents a floppy disk drive, a magnetic tape drive, a compact disk drive, an optical storage device, tape backup, etc.

The removable storage drive 814 interacts with a removable storage unit 816. The removable storage unit 816 includes a computer useable or readable storage medium 824 having stored therein computer software 828B (control logic) and/or data. Removable storage unit 816 represents a floppy disk, magnetic tape, compact disk, DVD, optical storage disk, or any other computer data storage device. The removable storage drive 814 reads from and/or writes to the removable storage unit 816 in a well known manner.

The computer 802 also includes input/output/display devices 822, such as monitors, keyboards, pointing devices, etc.

The computer 802 further includes a communication or network interface 818. The network interface 818 enables the computer 802 to communicate with remote devices. For example, the network interface 818 allows the computer 802 to communicate over communication networks or mediums 824B (representing a form of a computer useable or readable medium), such as LANs, WANs, the Internet, etc. The network interface 818 may interface with remote sites or networks via wired or wireless connections.

Control logic 828C may be transmitted to and from the computer 802 via the communication medium 824B. More particularly, the computer 802 may receive and transmit carrier waves (electromagnetic signals) modulated with control logic 830 via the communication medium 824B.

Any apparatus or manufacture comprising a computer useable or readable medium having control logic (software) stored therein is referred to herein as a computer program product or program storage device. This includes, but is not limited to, the computer 802, the main memory 808, the secondary storage devices 810, the removable storage unit 816 and the carrier waves modulated with control logic 830. Such computer program products, having control logic stored therein that, when executed by one or more data processing devices, cause such data processing devices to operate as described herein, represent embodiments of the invention.

The invention can work with software, hardware, and/or operating system implementations other than those described herein. Any software, hardware, and operating system implementations suitable for performing the functions described herein can be used.

8. Conclusion

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the claims and their equivalents.

What is claimed is:

1. A method of detecting and re-personalizing RFID tags, comprising:

obtaining a used single-use first anonymous ID (identification) from a RFID tag, the RFID tag comprising a memory divided into a first rewritable portion and a second rewritable portion, wherein said used single-use first anonymous ID is stored on the first rewritable portion;

generating a single-use second new anonymous ID different from said used single-use first anonymous ID; and determining if contents of said first rewritable portion and said second rewritable portion agree;

wherein, if said contents agree:

using either contents of said first rewritable portion or contents of said second rewritable portion to lookup a subject's record in a database, unlinking said used single-use anonymous ID from the RFID tag after reading the used single-use first anonymous ID when said single-use second new anonymous ID is generated, and writing said single-use second new anonymous ID to said second rewritable portion of said memory of said RFID tag; and wherein if said contents disagree:

individually using contents of said first rewritable portion and contents of said second rewritable portion to lookup said subject's record in said database, and writing said single-use second new anonymous ID to one of said first rewritable portion and said second rewritable portion having bad data stored thereon.

2. The method of claim 1, further comprising:

using said used single-use first anonymous ID to lookup said subject's record in a database;

changing said record to include said single-use second new anonymous ID to thereby provisionally link said single-use second new anonymous ID to said subject;

verifying said write of said single-use second new anonymous ID to said RFID tag; and committing said change in said database if said write is verified.

3. A system of detecting and re-personalizing RFID tags, comprising:

a database;

a module coupled to said database, wherein said module is configured to:

obtain a first single-use anonymous ID (identification) from a memory of a RFID tag divided into a first rewritable portion and a second rewritable portion, wherein said first single-use anonymous ID is stored on the first rewritable portion of said RFID tag;

generate a second single-use new anonymous ID different from the first single-use anonymous ID; and determine if contents of said first rewritable portion and said second rewritable portion agree;

wherein, if said contents agree:

use either contents of said first rewritable portion or contents of said second rewritable portion to lookup a subject's record in a database, unlink said used single-use anonymous ID from the RFID tag, and write said second single-use new anonymous ID to said second rewritable portion of said memory of said RFID tag after reading the first single-use anonymous ID when said second single-use new anonymous ID is generated; and wherein if said contents disagree:

individually using contents of said first rewritable portion and contents of said second rewritable portion to lookup said subject's record in said database, and writing said second single-use new anonymous ID to one of said first rewritable portion and said second rewritable portion having bad data stored thereon.

4. The system of claim 3, wherein said module is further configured to:

use said first single-use anonymous ID to lookup said subject's record in said database;

change said record to include said second single-use new anonymous ID to thereby provisionally link said second single-use new anonymous ID to said subject;

verify said write of said second single-use new anonymous ID to said RFID tag; and commit said change in said database if said write is verified.

5. A computer program product comprising a non-transitory computer useable medium having computer program logic recorded thereon for enabling a processor to perform operations to detect and re-personalize RFID tags, the operations comprising:

obtaining a first single-use anonymous ID (identification) from a RFID tag, the RFID tag comprising a memory divided into a first rewritable portion and a second rewritable portion, wherein said first single-use anonymous ID is stored on the first rewritable portion;

generating a second single-use new anonymous ID different from the first single-use anonymous ID; and determining if contents of said first rewritable portion and said second rewritable portion agree;

wherein, if said contents agree:

using either contents of said first rewritable portion or contents of said second rewritable portion to lookup a subject's record in a database, unlinking said used single-use anonymous ID from the RFID tag, and writing said second single-use second new anonymous ID to said second rewritable portion of said memory of said RFID tag after reading the first single-use anonymous ID when said second single-use new anonymous ID is generated; and wherein if said contents disagree:

individually using contents of said first rewritable portion and contents of said second rewritable portion to lookup said subject's record in said database, and writing said second single-use new anonymous ID to one of said first rewritable portion and said second rewritable portion having bad data stored thereon.

6. The computer program product of claim 5, the operations further comprising:

using said first single-use anonymous ID to lookup said subject's record in a database;

changing said record to include said second single-use new anonymous ID to thereby provisionally link said second single-use new anonymous ID to said subject;

verifying said write of said second single-use new anonymous ID to said RFID tag; and committing said change in said database if said write is verified.

7. A method of detecting and re-personalizing RFID tags, comprising:

obtaining data from a memory of a RFID tag, wherein said memory has a first rewritable partition and a second rewritable partition;

generating a new single-use second anonymous ID;

determining if contents of said first rewritable and second rewritable partition agree;

wherein, if said contents agree:
- using either contents of said first rewritable partition or contents of said second rewritable partition to lookup a subject's record in a database,
- unlinking a used single-use anonymous ID from the RFID tag, and
- writing said new single-use second anonymous ID to said second rewritable portion of said memory of said RFID tag after obtaining the data when said new single-use second anonymous ID is generated; and wherein if said contents disagree:
- individually using contents of said first rewritable partition and contents of said second rewritable partition to lookup said subject's record in said database, and
- writing said new single-use second anonymous ID to one of said first partition and said second partition having bad data stored thereon.

8. The method of claim 7, further comprising:
verifying said write of said new single-use second anonymous ID; and
if said write is verified, then writing said new single-use second anonymous ID to said first rewritable partition of said RFID tag.

9. The method of claim 7, further comprising:
committing database changes to thereby link said new single-use second anonymous ID to said subject if either said write to said first partition or said write to said second partition is verified.

10. A system of detecting and re-personalizing RFID tags, comprising:
a database;
a module coupled to said database, wherein said module is configured to:
- obtain data from a memory of a RFID tag, wherein said memory comprises a memory divided into a first rewritable partition and a second rewritable partition, wherein a first anonymous ID is stored on the first rewritable partition;
- generate a new single-use second anonymous ID; and
- determine if contents of said first rewritable partition and said second rewritable partition agree;

wherein, if said contents agree:
- use either contents of said first rewritable partition or contents of said second rewritable partition to lookup a subject's record in said database,
- unlink a used anonymous ID from the RFID tag, and
- write said new single-use second anonymous ID to said second rewritable partition of said memory of said RFID tag after obtaining the data when said new single-use second anonymous ID is generated; and wherein if said contents disagree:
- individually using contents of said first rewritable partition and contents of said second rewritable partition to lookup said subject's record in said database, and
- writing said new single-use second anonymous ID to one of said first rewritable partition and said second rewritable partition having bad data stored thereon.

11. The system of claim 10, wherein said module is further configured to:
verify said write of said new single-use second anonymous ID; and
write said new single-use second anonymous ID to said first partition of said RFID tag, if said write is verified.

12. The system of claim 10, wherein said module is further configured to:
commit database changes to thereby link said new single-use second anonymous ID to said subject if either said write to said first rewritable partition or said write to said second rewritable partition is verified.

13. A computer program product comprising a non-transitory computer useable medium having computer program logic recorded thereon for enabling a processor to perform operations to detect and re-personalize RFID tags, the operations comprising:
obtaining data from a memory of a RFID tag, wherein said memory comprises a first rewritable partition and a second rewritable partition, wherein a first anonymous ID is stored on the first rewritable partition;
generating a new single-use second anonymous ID; and
determining if contents of said first rewritable partition and said second rewritable partition agree;

wherein, if said contents agree:
- using either contents of said first rewritable partition or contents of said second rewritable partition to lookup a subject's record in a database,
- unlinking a used single-use anonymous ID from the RFID tag, and
- writing said new single-use second anonymous ID to said second rewritable partition of said memory of said RFID tag after obtaining the data when said new single-use second anonymous ID is generated; and wherein if said contents disagree:
- individually using contents of said first rewritable partition and contents of said second rewritable partition to lookup said subject's record in said database, and
- writing said new single-use second anonymous ID to one of said first rewritable partition and said second rewritable partition having bad data stored thereon.

14. The computer program product of claim 13, the operations further comprising:
verifying said write of said new single-use second anonymous ID; and
writing said new single-use second anonymous ID to said first rewritable partition of said RFID tag, if said write is verified.

15. The computer program product of claim 13, the operations further comprising:
committing database changes to thereby link said new single-use second anonymous ID to said subject if either said write to said first rewritable partition or said write to said second rewritable partition is verified.

16. The method of claim 1, further comprising:
determining that the single-use second new anonymous ID stored on the second rewritable portion of the RFID tag is used;
generating a single-use third new anonymous ID different from the single-use first anonymous ID and the single-use second new anonymous ID; and
writing said single-use third new anonymous ID to said first rewritable portion of said memory of said RFID tag, and unlinking the used single-use second new anonymous ID from the RFID tag after reading the used single-use second new anonymous ID when said single-use third new anonymous ID is generated.

* * * * *